(12) United States Patent
Leong et al.

(10) Patent No.: US 8,237,684 B2
(45) Date of Patent: Aug. 7, 2012

(54) USER INPUT DEVICE WITH PLANAR LIGHT GUIDE ILLUMINATION PLATE

(75) Inventors: Yat Kheng Leong, Selangor (MY); Sai Mun Lee, Penang (MY); Hung Kwang Lee, Pengang (MY); Jin Kiong Ang, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 926 days.

(21) Appl. No.: 12/239,192

(22) Filed: Sep. 26, 2008

(65) Prior Publication Data

US 2010/0079408 A1 Apr. 1, 2010

(51) Int. Cl.
*G06F 3/042* (2006.01)
*G06F 3/041* (2006.01)
*G09G 5/00* (2006.01)

(52) U.S. Cl. .......................... 345/175; 345/173; 345/156
(58) Field of Classification Search .................... 345/175
See application file for complete search history.

(56) References Cited

U.S. PATENT DOCUMENTS

| | | | | |
|---|---|---|---|---|
| 6,552,713 B1 * | 4/2003 | Van Brocklin et al. | ....... | 345/157 |
| 7,164,411 B2 * | 1/2007 | Keranen et al. | ............... | 345/156 |
| 7,313,255 B2 | 12/2007 | Machida et al. | | |
| 2004/0160420 A1 * | 8/2004 | Baharav et al. | ............... | 345/173 |
| 2005/0243055 A1 * | 11/2005 | Ranta et al. | ................... | 345/156 |
| 2006/0227120 A1 * | 10/2006 | Eikman | ......................... | 345/175 |
| 2006/0255248 A1 * | 11/2006 | Eliasson | ....................... | 250/221 |
| 2008/0291422 A1 * | 11/2008 | Kremer | .......................... | 355/71 |
| 2009/0191946 A1 * | 7/2009 | Thomas et al. | ................. | 463/20 |

FOREIGN PATENT DOCUMENTS

WO    WO 0237411 A1 * 5/2002
WO    WO 2009020940 A2 * 2/2009

* cited by examiner

*Primary Examiner* — Alexander S Beck
*Assistant Examiner* — Kirk Hermann (57) ABSTRACT

A user input device to generate an optical navigation signal based on an edge-lit pattern. The user input device includes an optical element, a light source, a sensor array, and a navigation engine. The optical element includes a finger interface surface. At least a portion of the optical element exhibits total internal reflection (TIR). The light source provides light to the finger interface surface. The sensor array detects light reflected from the finger interface surface in response to contact between a finger and the finger interface surface. The contact between the finger and the finger interface surface disrupts the TIR and causes light to be reflected out of the optical element towards the sensor array. The navigation engine generates lateral movement information, which is indicative of lateral movement of the finger relative to the sensor array, in response to the detected light.

11 Claims, 12 Drawing Sheets

USER INPUT DEVICE WITH PLANAR LIGHT GUIDE ILLUMINATION PLATE

BACKGROUND

Optical navigation devices use a light source to illuminate a navigation surface so that an optical imager can generate digital images for computing motion. For example, an optical imager can image a finger on a surface and generate a navigation signal based on comparisons of sequential images. However, as the size of conventional navigation devices is reduced, the physical space for the optical elements and sensors for detecting the optical navigation input are also reduced.

For example, some conventional optical navigation device packages have a thickness, or optical height, of about 2.5 mm. The optical height refers to the distance from an optical finger interface surface to a corresponding sensor. The optical height is also referred to as the optical track. An optical track, or thickness, of 2.5 mm is considered too thick for some implementations of handheld devices such as cellular telephones and small portable personal computing (PC) peripherals.

As the optical track of a device is reduced, the viewing angle of the optical sensor through an intermediate optical lens is affected. In particular, the reduced optical track increases the image intensity roll-off, which is the reduction in light at the edges of the optical lens. In many instances, the image roll-off increases exponentially relative to the decreased optical track. As one example, the image intensity at the edge of the optical lens may be about 40% of the image intensity at the center of the optical lens. This has an adverse effect of reducing the accuracy of the imaging lens. In particular, this problem of increased image intensity roll-off is highly affected when the total distance of the optical track is less than about twice the width of the optical sensor.

SUMMARY

Embodiments of a system are described. In one embodiment, the system is a portable electronic system with optical finger navigation. The system includes a display, an optical element, a light source, and an optical finger navigation device. The display includes a navigation indicator. The optical element includes a finger interface surface. At least a portion of the optical element exhibits total internal reflection (TIR). The light source is in optical communication with the finger interface surface to provide light from the light source to the finger interface surface. The optical finger navigation device generates a navigation signal to move the navigation indicator based on a detected light pattern according to contact between a finger and the finger interface surface, which disrupts the TIR of the optical element and causes light to be reflected out of the optical element towards the optical finger navigation device. Other embodiments of the system are also described.

Embodiments of an apparatus are also described. In one embodiment, the apparatus is a user input device. The user input device includes an optical element, a light source, a sensor array, and a navigation engine. The optical element includes a finger interface surface. At least a portion of the optical element exhibits total internal reflection (TIR). The light source is in optical communication with the finger interface surface to provide light from the light source to the finger interface surface. The sensor array detects light reflected from the finger interface surface in response to contact between a finger and the finger interface surface. The contact between the finger and the finger interface surface disrupts the TIR and causes light to be reflected out of the optical element towards the sensor array. The navigation engine generates lateral movement information, which is indicative of lateral movement of the finger relative to the sensor array, in response to the detected light. Other embodiments of the apparatus are also described.

Embodiments of a method are also described. In one embodiment, the method is a method for optical finger navigation. The method includes generating light at a light source. The method also includes directing the light into a light guide including a finger contact portion. At least a portion of the light guide exhibits total internal reflection (TIR). The method also includes detecting light reflected from the light guide toward a sensor array in response to a disruption of the TIR exhibited by the light guide. The method also includes generating a navigation signal based on the detected light. Other embodiments of the method are also described.

Other aspects and advantages of embodiments of the present invention will become apparent from the following detailed description, taken in conjunction with the accompanying drawings, illustrated by way of example of the principles of the invention.

DETAILED DESCRIPTION

Figure 1A:
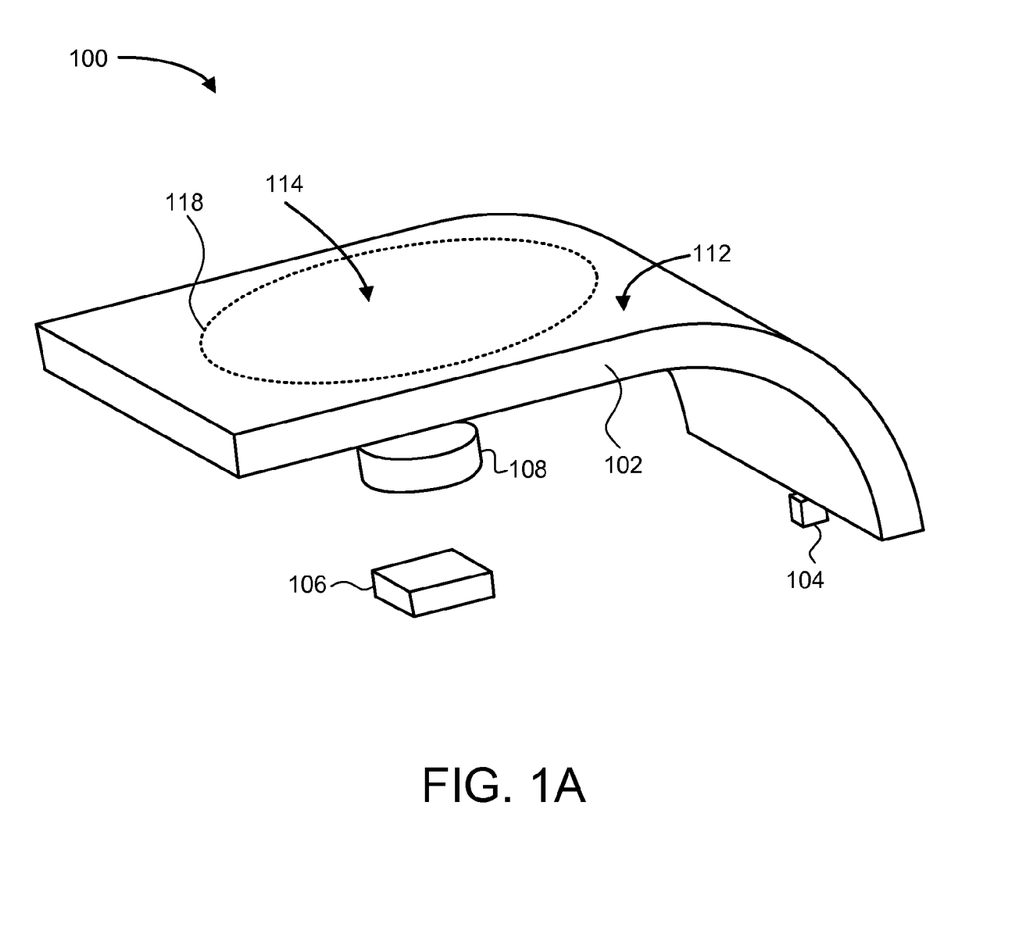
FIG. 1A depicts a perspective view of one embodiment of a user input device in the form of an optical navigation device.

FIG. 1A depicts a perspective view of one embodiment of a user input device in the form of an optical finger navigation device 100. The optical finger navigation device 100 includes an optical element 102, a light source 104, a sensor array 106, and a lens 108. Although the optical finger navigation device 100 is shown and described with certain components and functionality, other embodiment may be implemented with fewer or more components to facilitate less or more functionality.

In some embodiments, the optical element 102 is constructed of glass, clear plastic, or some other light transmissive material. The optical element 102 has a curved geometry to facilitate total internal reflection (TIR) of the light generated at the light source 104. Hence, the optical element 102 is also referred to as a planar light guide illumination plate. Even though the optical element 102 may have a curved geometry, the optical characteristics of the optical element 102 are nevertheless similar to a planar geometry with respect to the TIR of the light within the optical element 102. In some embodiments, the optical element 102 may have a polished surface to further facilitate the total internal reflection. Additionally, a reflective coating may be applied to the surface of the optical element 102. In other embodiments, the curved geometry of the optical element 102 has a reflective material diffused below the outer surface of the optical element 102 to further facilitate the total internal reflection of the light generated by the light source 104.

The optical element 102 includes a major surface 112. In the illustrated embodiment, the major surface 112 is the top surface of the optical element 102. As depicted, the major surface 112 includes a portion that is substantially planar and extends approximately from the outside surface of the section of the optical element 102 that has a curved geometry to the end of the optical element 102 opposite the light source 104. The major surface 112 also may include the top surface of the curved portion of the optical element 102.

The optical element 102 also includes a finger interface surface 114. More specifically, a portion of the major surface 112 is designated as the finger interface surface 114. The finger interface surface 114 is generally the portion of the major surface 112 at which a finger (not shown) contacts the optical element 102. In some embodiments, the finger interface surface 114 includes more or less surface area of the optical element 102 than is shown in FIG. 1A. In some embodiments, the finger interface surface 114 is circular. Alternatively, the finger interface surface 114 is non-circular.

The finger interface surface 114 facilitates user contact with the optical element 102. Contact of, for example, a user's finger with the finger interface surface 114 causes light to be reflected and scattered toward the sensor array 106. Since the finger contact may be monitored and finger movements may be calculated, the finger contact with the finger interface surface 114 facilitates a user input at the optical element 102.

For ease of reference, the optical element 102 also includes a finger contact portion 118. The finger contact portion 118 generally corresponds to the finger interface surface 114. In an embodiment, the finger interface surface 114 and the finger contact portion 118 are linearly aligned with approximately the center of the optical lens 108 and the sensor array 106. More specifically, the finger interface surface 114 and the finger contact portion 118 may be approximately centered on an axis that runs through the center of the optical lens 108 and the sensor array 106. In other embodiments, the finger interface surface 114 and the finger contact portion 118 may be at least partially out of alignment with the optical lens 108 and/or the sensor array 106.

In the illustrated embodiment of FIG. 1A, the finger contact portion 118 of the optical element 102 is in the same plane as the major surface 112. However, other embodiments described below include at least a portion of the finger contact portion 118 which is out-of-plan with the major surface 112 (e.g., see FIG. 1D). In some embodiments, the finger contact portion 118 is substantially parallel to the major surface 112. In some embodiments, the finger contact portion 118 has a flat geometry.

The finger contact portion 118 facilitates illumination of a navigation object such as a finger so that contact between the navigation object and the finger interface surface 114 disrupts the total internal reflection (TIR) of the optical element 102. Hence, the contact between the navigation object and the finger interface surface 114 reflects and scatters light which is detected by the sensor array 106. In this way, the finger contact portion 118 may facilitate detection of a finger navigation input at the optical element 102.

Figure 1B:
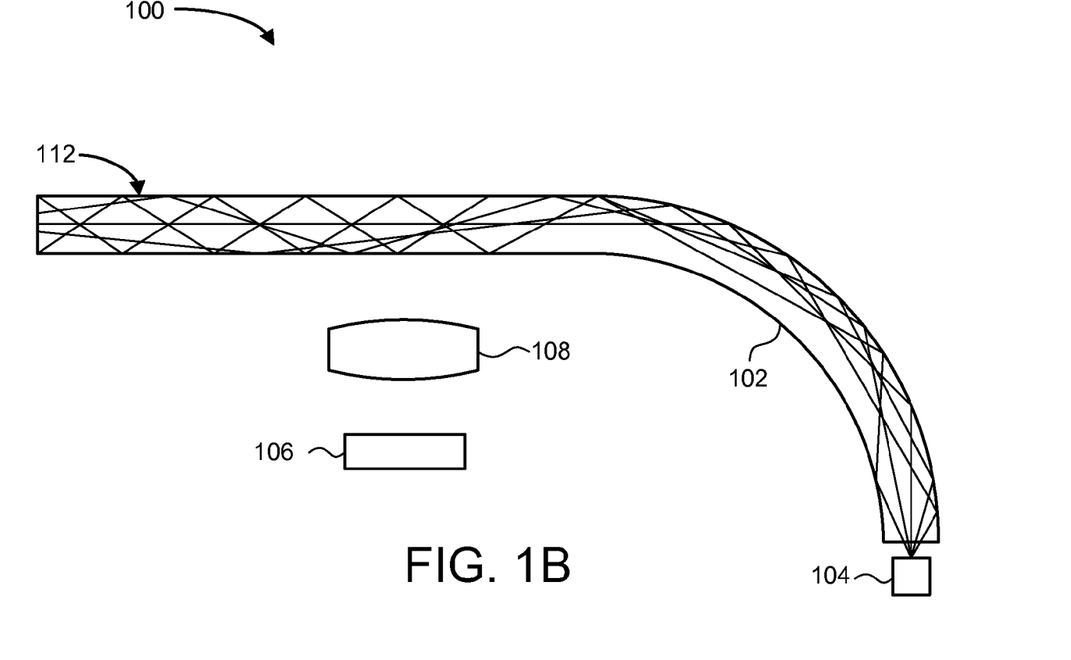
FIG. 1B depicts a cross-sectional diagram of one embodiment of the optical finger navigation device of FIG. 1A.

FIG. 1B depicts a cross-sectional diagram of one embodiment of the optical finger navigation device 100 of FIG. 1A. The optical finger navigation device 100 includes the optical element 102, the light source 104, the lens 108, and the sensor array 106. The optical element 102 includes the major surface 112. The light source 104 directs light into the optical element 102. The optical element 102 reflects the light internally through total internal reflection (TIR). The TIR of the light within the optical element 102 is uninterrupted and simply reflects back and forth within the optical element. In the absence of finger contact with the optical element 102, or another disruption of the TIR within the optical element 102, relatively little or no light enters the lens 108 or is detected at the sensor array 106.

Figure 1C:
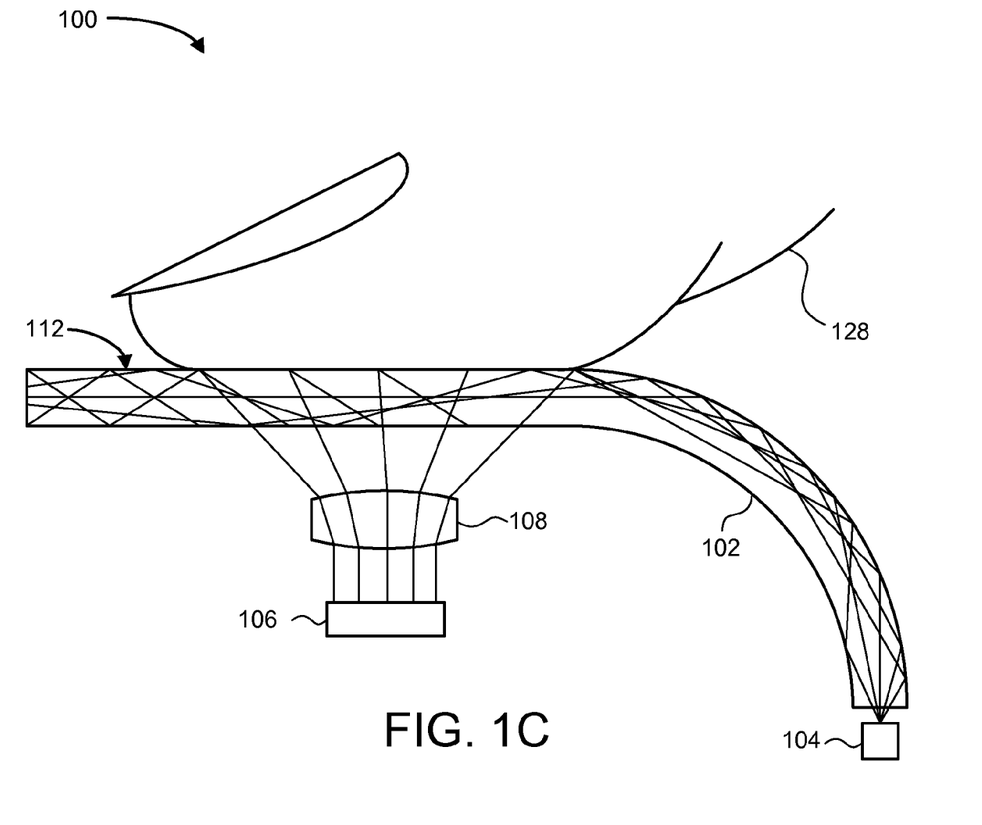
FIG. 1C depicts a cross-sectional diagram of one embodiment of the optical finger navigation device of FIG. 1A with a finger positioned relative to the optical element to disrupt the total internal reflection (TIR) of the optical element.

FIG. 1C depicts a cross-sectional diagram of one embodiment of the optical finger navigation device 100 of FIG. 1A with a finger 128 positioned relative to the optical element 102 to disrupt the total internal reflection (TIR) of the optical element 102. In the illustrated embodiment, the finger 128 physically contacts the major surface 112 at about the finger contact portion 118 of the optical element 102 and interrupts the TIR of the light reflected within the optical element 102. The physical contact between the finger 128 and the optical element 102 disrupts the TIR and scatters (i.e., reflects) the light the light out of the optical element 102 and at least partially toward the optical lens 108. Some of the light that leaves the optical element 102 is collected by the lens 108 and directed to the sensor array 106 to generate one or more images of the finger 128 at the finger contact portion 118 of the optical element 102.

Figure 1D:
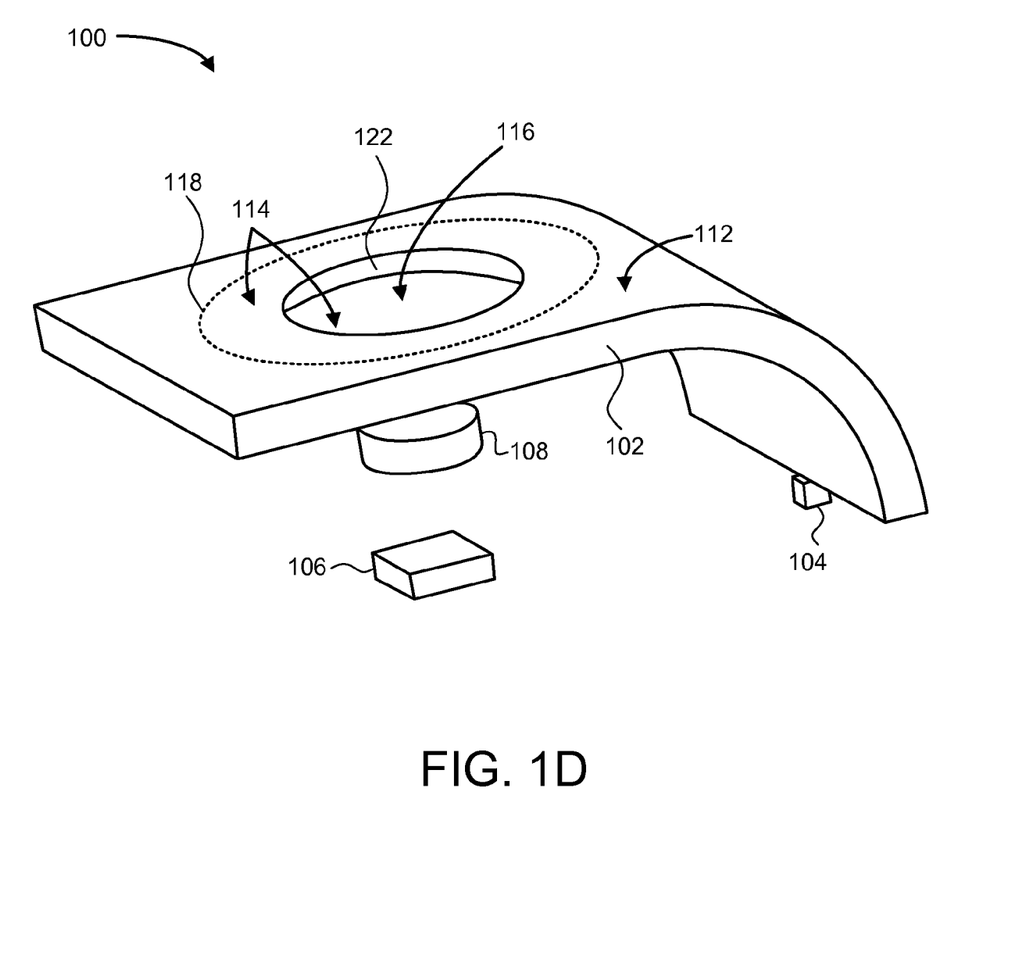
FIG. 1D depicts a perspective view of another embodiment of the user input device in the form of an optical finger navigation device with a recess in the major surface of the optical element.

FIG. 1D depicts a perspective view of another embodiment of the user input device in the form of an optical finger navigation device 100 with a recess 116 in the major surface of the optical element 102. In the depicted embodiment, the optical element 102 defines the recess 116 in the major surface 112 of the optical element 102. In general, the recess 116 is merely a depression within the top surface of the optical element 102. In some embodiments, the recess 116 is circular in geometry. As one example, the recess 116 may have dimensions to approximately match a field of view of the sensor array 106. More specifically, the recess 116 may have a radius of approximately a field of view of the sensor array. Additionally, the recess 116 may have a depth of approximately 100-150 μm. Other embodiments of the circular recess 116 may have other dimensions. In other embodiments, the optical element 102 defines the recess 116 with a non-circular geometry. The recess 116 interrupts the TIR of the optical element 102 and causes light from within the optical element 102 to exit the optical element 102 and illuminate a navigation object such as a finger.

Additionally, in the illustrated optical finger navigation device 100, the finger contact portion 118 of the optical element 102 includes the recess 116. In some embodiments, the finger contact portion 118 is substantially parallel to the major surface 112. In other embodiments, the finger contact portion 118 is generally oriented at a non-zero angle with respect to the finger interface surface 114. In some embodiments, the finger contact portion 118 has a flat geometry. In other embodiments, the finger contact portion 118 has a curved or non-linear geometry. Other embodiments of the finger contact portion 118 facilitate illumination of the finger when the finger is not in contact with the finger contact portion 118.

In one embodiment, the recess 116 generates an edge-lit light intensity pattern for detection by the sensor array 106. The edge-lit light intensity pattern has a relatively high light intensity along the edge of the intensity pattern and relatively less intensity towards the center. In particular, as the light from the light source 104 reflects internally within the optical element 102, the TIR of the light is disrupted by at least a portion of the recess 116. Thus, the light exits the optical element 102, for example, at the edge of the recess 116 and illuminates the navigation object so that the sensor array 106 detects the edge-lit light intensity pattern.

In some embodiments, the recess 116 is configured to optically match the lens 108. The recess 116 can optically match the lens 108 by generating an edge-lit intensity pattern with higher levels of intensity at the edge of the pattern and lower intensity towards the center and, hence, compensating for an intensity roll-off of the optical lens 108. For example, if the optical intensity at the edge of the optical lens 108 is approximately 40% of the intensity at the center of the lens, then the recess 116 may be configured to provide increased illumination of at least one edge of the navigation device by approximately 60% relative to the illumination of the navigation device at the center of the recess 116. In this way, the increased edge illumination of the navigation object compensates for the increased light intensity roll-off of the optical lens 108, so the sensor array 106 may detect a lower contrast image of the navigation device. Thus, the recess 116 and the lens 108 may be optically matched to mutually compensate for the respective intensity pattern differences and allow the sensor array 106 to generate a relatively more even intensity pattern.

In the depicted embodiment, the recess 116 also includes a transition portion 122. The transition portion 122 forms, at least partially, the interior wall (i.e., a sidewall) along the edge of the recess 116. The transition portion 122 has a height less than the thickness of the optical element 102. In some embodiments, the transition portion 122 is oriented perpendicular to the plane of the finger contact portion 118. In another embodiment, the transition portion 122 is oriented at a non-perpendicular angle relative to the finger contact portion 118 and/or the major surface 112 of the optical element 102. The size, angle, and orientation of the transition portion 122 of the recess 116 may have a substantial impact on the interruption of the TIR within the optical element 102 to direct the light to illuminate the finger.

Figure 2A:
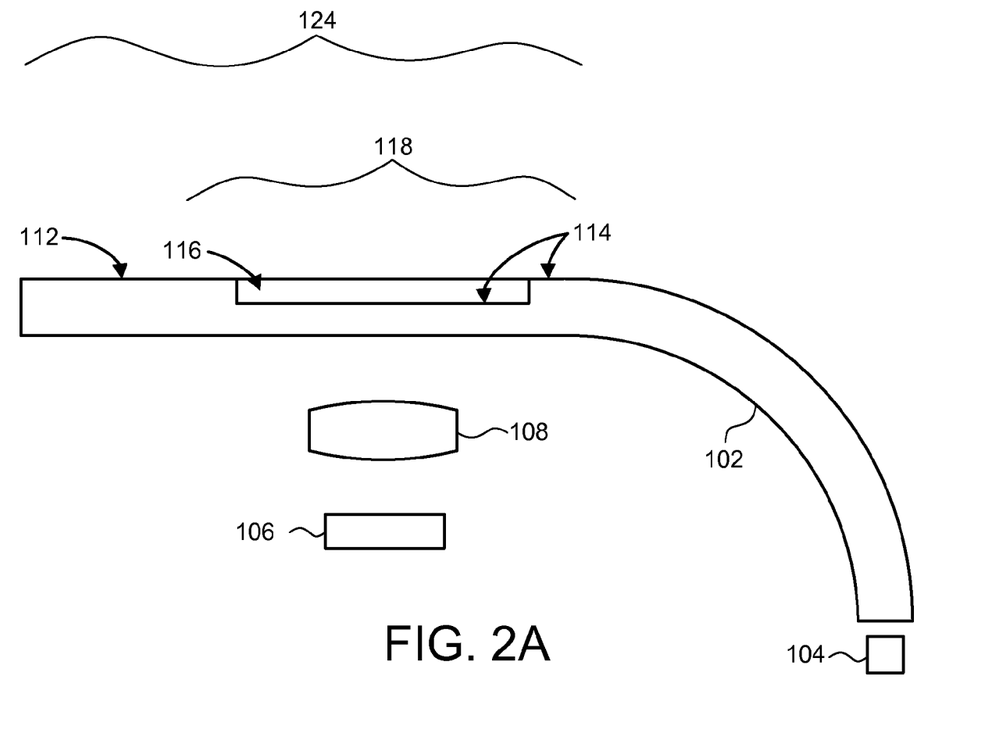
FIG. 2A depicts a cross-sectional diagram of one embodiment of the optical finger navigation device of FIG. 1D.

FIG. 2A depicts a cross-sectional diagram of one embodiment of the optical finger navigation device 100 of FIG. 1D. The depicted optical finger navigation device 100 includes the optical element 102, the light source 104, the sensor array 106, and the lens 108. The optical element 102 includes the recess 116 and a substantially planar portion 124. In some embodiments, the substantially planar portion 124 of the optical element 102 includes the recess 116. The substantially planar portion 124 of the optical element 102 may include all or part of the finger interface surface 114 and/or the finger contact portion 118.

The recess 116 may be located closer or farther from the curved section of the optical element 102. In some embodiments, the recess 116 has a rectilinear profile geometry. In other embodiments, the recess 116 has a curved or non-linear profile geometry. Additionally, the lens 108 may be coupled to the optical element 102. For example, the lens 108 may be integrally molded with the optical element 102. Alternatively, the lens 108 may be separate from the optical element 102.

Figure 2B:
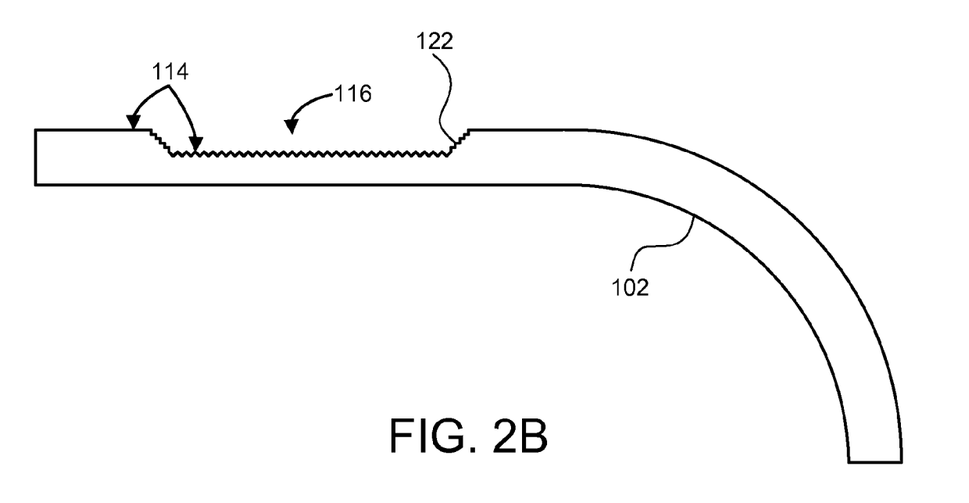
FIG. 2B depicts a cross-sectional view of one embodiment of the optical element of the optical finger navigation device of FIG. 2A.

FIG. 2B depicts a cross-sectional view of one embodiment of the optical element 102 of the optical finger navigation device 100 of FIG. 2A. The cross-sectional view of the optical element 102 illustrates the recess 116, the finger interface surface 114 (both at the major surface 112 and within the recess 116), and the transition portion 122 of the recess. As shown, the finger interface surface within the recess 116 is not flat and smooth. The non-uniformity of the finger interface surface 114 may affect the light distribution pattern at on the navigation object (not shown). In some embodiments, the non-uniformity of the finger navigation surface 114 further disrupts the TIR of the light within the optical element 102.

In the depicted embodiment, the transition portion 122 also includes a non-uniform surface finish. The transition portion 122 may be oriented at a non-zero angle with respect to the finger contact portion 118. In one embodiment, the non-uniform surface finish of the transition portion 122 and the finger contact portion 118 results from a chemical alteration of the surface. In another embodiment, the non-uniform surface is mechanically altered to create the non-uniform surface finish. Other embodiments have other qualities of non-uniform surface finishes.

Figure 2C:
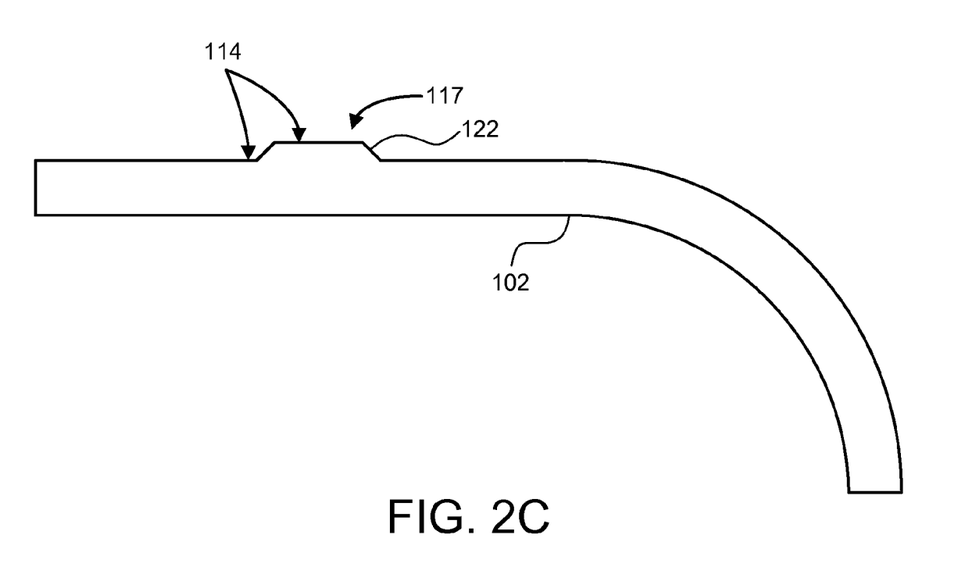
FIG. 2C depicts a cross-sectional view of another embodiment of the optical element of the optical finger navigation device of FIG. 2A.

FIG. 2C depicts a cross-sectional view of the optical element 102 of FIG. 2A. The cross-sectional view of the optical element 102 illustrates an optical rise 117, instead of the recess 116 as shown in FIG. 2B. The optical rise 117 is generally a raised surface feature of the optical element 102 that is raised, or extends, above the major surface 112 of the optical element 102. In some embodiments, the optical rise 117 is substantially circular or spherical in geometry. As one example, the optical rise 117 may have dimensions to approximately match a field of view of the sensor array 106. More specifically, the optical rise 117 may have a radius of approximately a field of view of the sensor array. Additionally, the optical rise 117 may have a height of approximately 100-150 μm. Other embodiments of the circular or spherical optical rise 117 may have other dimensions. Other embodiments incorporate other geometries in the optical rise 117. Since the optical rise 117 extends away from the sensor array 106, at least part of the finger interface surface 114 of the optical element 102 is above the plane of the major surface 112. The transition portion 122 of the optical rise 117 allows light to exit the optical element 102. Hence, the optical rise 117 disrupts the TIR of the light within the optical element 102 at the transition portion 122, and the light that escapes through the transition portion 112 of the optical rise 117 illuminates a finger or other navigation object at the edges of the field of view of the sensor array 106. Although not shown, some embodiments of the optical rise 117 also may have a surface that is not flat and/or not smooth, similar to the recess 116 of FIG. 2B.

Figure 2D:
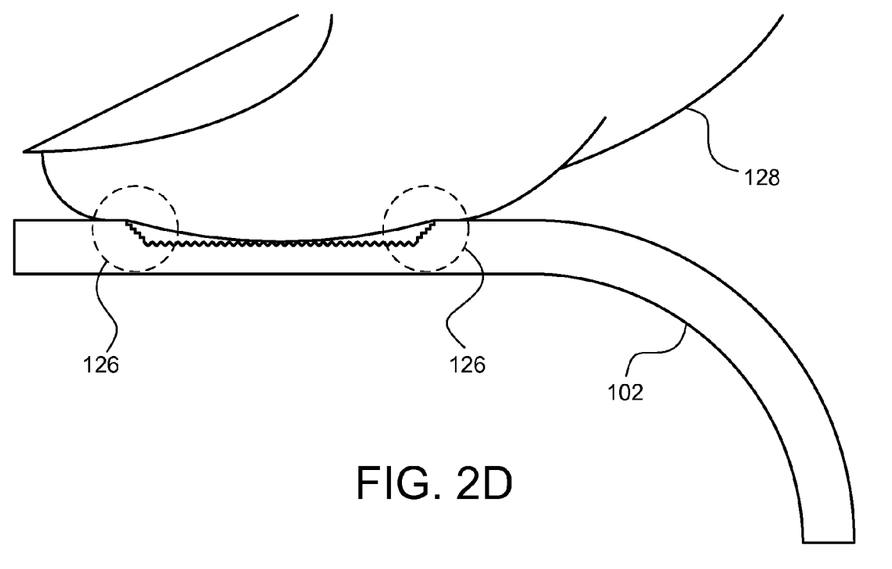
FIG. 2D depicts a cross-sectional diagram of the optical element of FIG. 2B with a finger positioned relative to a recess.

FIG. 2D depicts a cross-sectional drawing of the optical element 102 of FIG. 2B with a finger 128 positioned relative to the recess 116. FIG. 2D also indicates two illumination locales 126, which are generally designated by the dashed circles. In some embodiments, the illumination locales 126 are located at the transition portions 122 which are oriented substantially perpendicular to the major surface 112 of the optical element 102. In another embodiment, the illumination locales 126 are located at the transition portions 122 which are oriented at another non-zero angle relative to the major surface 112 of the optical element 102. The finger 128 is placed on the optical element 102 in the vicinity of the illumination locales 126. The transition portions 122 at the illumination locales 126 interrupt the TIR of the light within the optical element 102 and allow the light to illuminate a finger 128 in contact with the finger interface surface 114 or otherwise within a relatively close distance from the finger contact portion 118 of the optical element 102. As light passes through the transition portions 122, the surface of the finger 128 near the illumination locales 126 reflects and scatters the light. In this manner, the intensity of the light at the illumination locales 126 is relatively high to produce an edge-lit pattern that at least partially compensates for the intensity roll-off of the optical lens 106, so that the sensor array 106 detects a light patter that is more uniform than it would be without the edge-lit patter at the illumination locales 126.

Figure 2E:
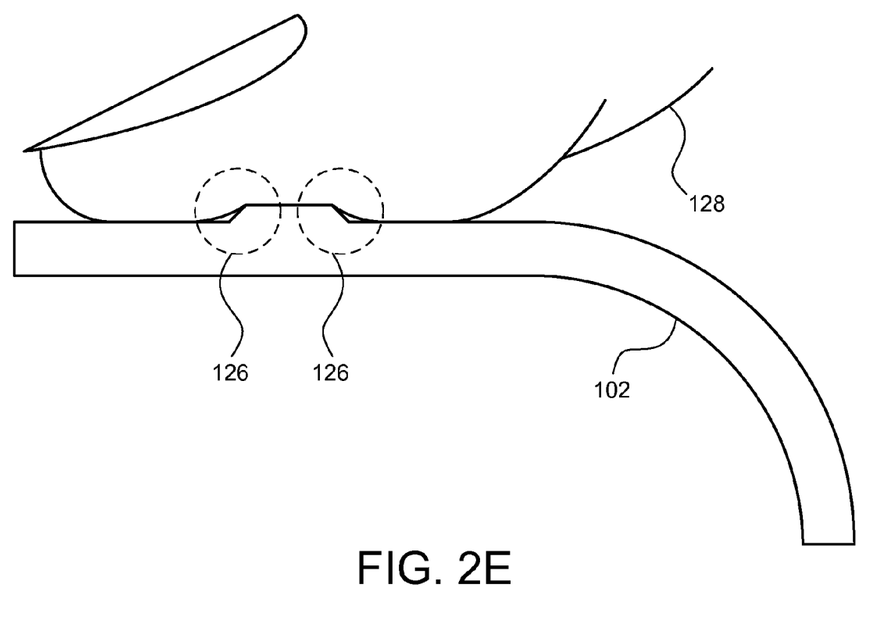
FIG. 2E depicts a cross-sectional diagram of the optical element of FIG. 2C with a finger positioned relative to an optical rise.

FIG. 2E depicts a cross-sectional diagram of the optical element 102 of FIG. 2C with a finger 128 positioned relative to the optical rise 117. Like FIG. 2D, FIG. 2E indicates the illumination locales 126 which result from the light exiting the optical element 102 at about the transition portions 122 of the optical rise 117.

It should also be noted that, while the embodiments shown in FIGS. 2D and 2E exclusively show the recess 116 and the optical rise 117, some embodiments of the optical element 102 may include a combination of one or more recesses 116 with one or more optical rises 117. Additionally, since the light intensity incident on the finger 128 may be greater on the side of the finger 128 that is closest to the light source 104, a combination of varying depths and heights may be used to graduate the light intensity across a greater distance of the finger contact portion 118 and, hence, the finger 128.

Figure 3:
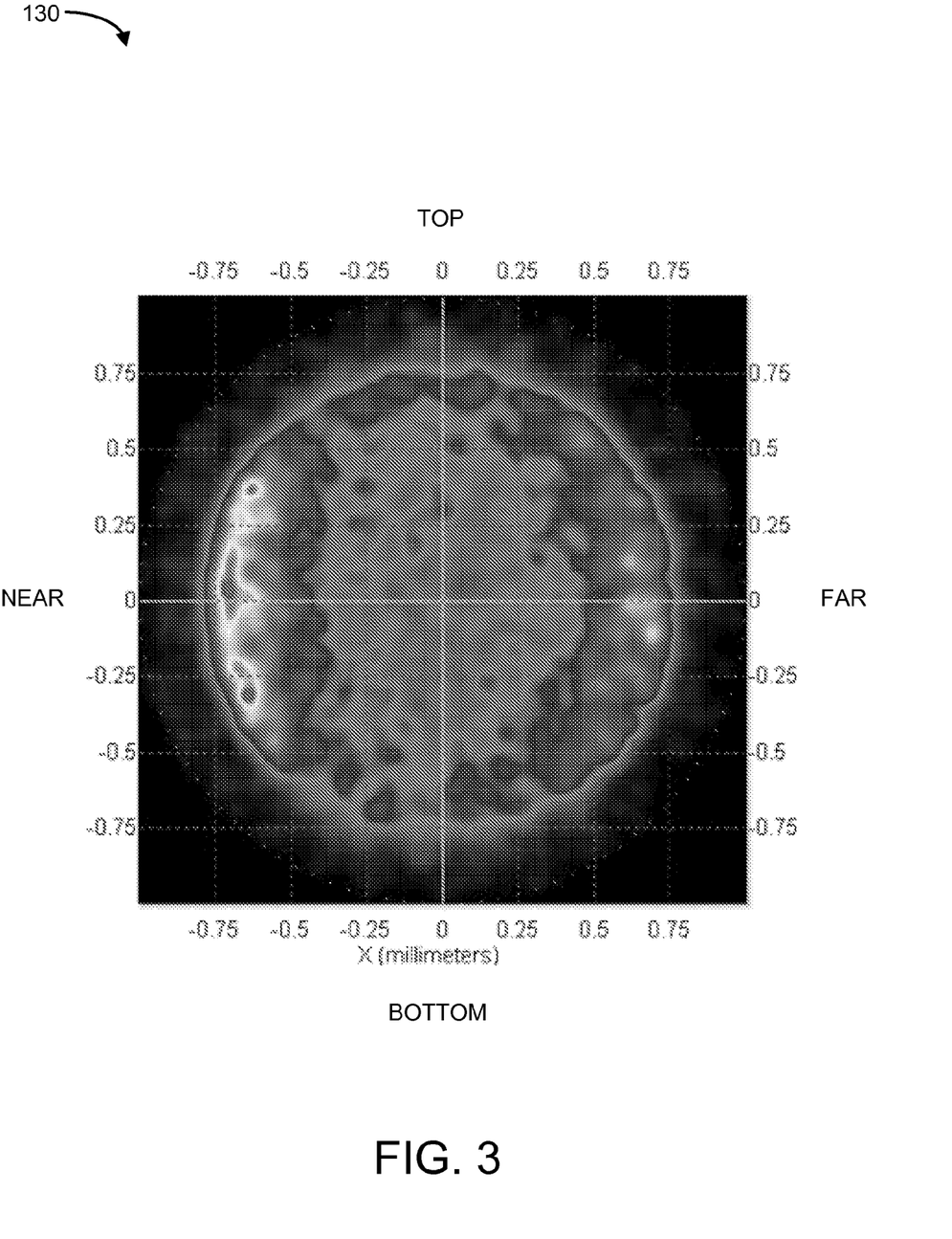
FIG. 3 depicts a contour graph representative of one embodiment of a light intensity pattern generated by the optical element of the optical finger navigation device of FIG. 1D.

FIG. 3 depicts a contour graph 130 representative of one embodiment of a light intensity pattern generated by the optical element 102 of the optical finger navigation device 100 of FIG. 1D. The light intensity pattern is indicative of the illumination pattern of light escaped from the recess 116 or optical rise 117 that will reach the finger. The reflection of the light intensities on the finger with the effect of the recess 116 or optical rise 117 is detected at the sensor array 106. The contour graph 130 depicts an edge-lit pattern, or a pattern that has a relatively high light intensity around the edges of the pattern. In particular, the contour graph 130 illustrates that the light intensity may be greater at the side of the finger 128 that is located near the light source 104 (designated as "NEAR" on the left side of the contour graph 130). Also, the contour graph 130 illustrates that the light intensity may be less intense at the far side of the finger 128 (designated as "FAR" on the right side of the contour graph 130). This difference in light intensities results from a greater intensity on the near side and a substantially smaller intensity on the far side because the light that is disrupted on the far side travels further from the light source and at least partially reflects from the end of the optical element 102 before reaching the respective transition portion 122. In contrast, the top and bottom edges of the light intensity pattern are not necessarily affected by the incident light because of the respective transition portions 122 at these edges. However, other embodiments may have recesses 116 and/or optical rises 117 which further manipulate the light intensity to increase or decrease the relative intensity of the various edges.

Figure 4:
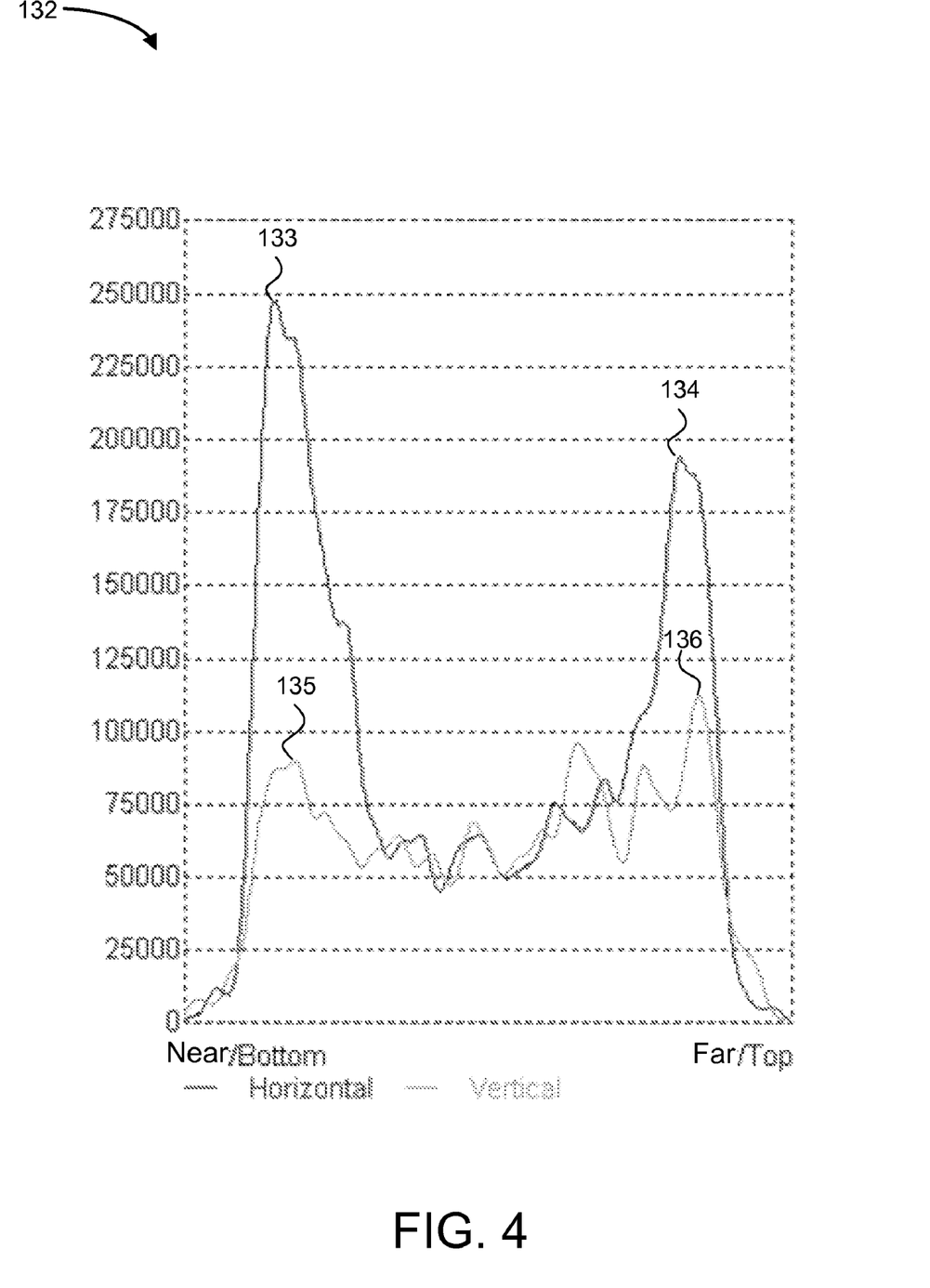
FIG. 4 depicts a line graph representative of the light intensity pattern of the contour graph of FIG. 3.

FIG. 4 depicts a profile line graph 132 representative of a portion of the light intensity pattern of the contour graph 130 of FIG. 3. In particular, the line with peaks 133 and 134 is representative of the intensity of the light pattern from the near to far edges on the contour graph 130 of FIG. 3 (e.g., along the horizontal zero line). The peaks 133 and 134 occur at the edges of the light pattern. The near-side horizontal high peak 133 depicts the high intensity on the near or left-hand side of the intensity pattern of the contour graph 130. The far-side horizontal high peak 134 depicts the intensity peak on the far or right-hand side of the contour graph 130. The far-side horizontal peak 134 is of a lesser intensity relative to the near-side horizontal peak 133, which is representative of the side of the recess 116 nearer the light source 104.

The line that includes peaks 135 and 136 depicts the light intensity from the bottom to the top on the contour graph 130 of FIG. 3 (e.g., along the vertical zero line). The peaks 135 and 136 occur at the edges of the intensity pattern. The bottom vertical peak 135 is representative of the intensity of the light pattern at the bottom of the contour graph 130. The top vertical peak 136 is representative of the intensity of the light pattern at the bottom of the contour graph 130. While the light intensity increase is not as great for the top and bottom edges of the finger contact portion 118, this line graph 132 illustrates that there may be some increase in all of the edges of the finger contact portion 118.

Figure 5:
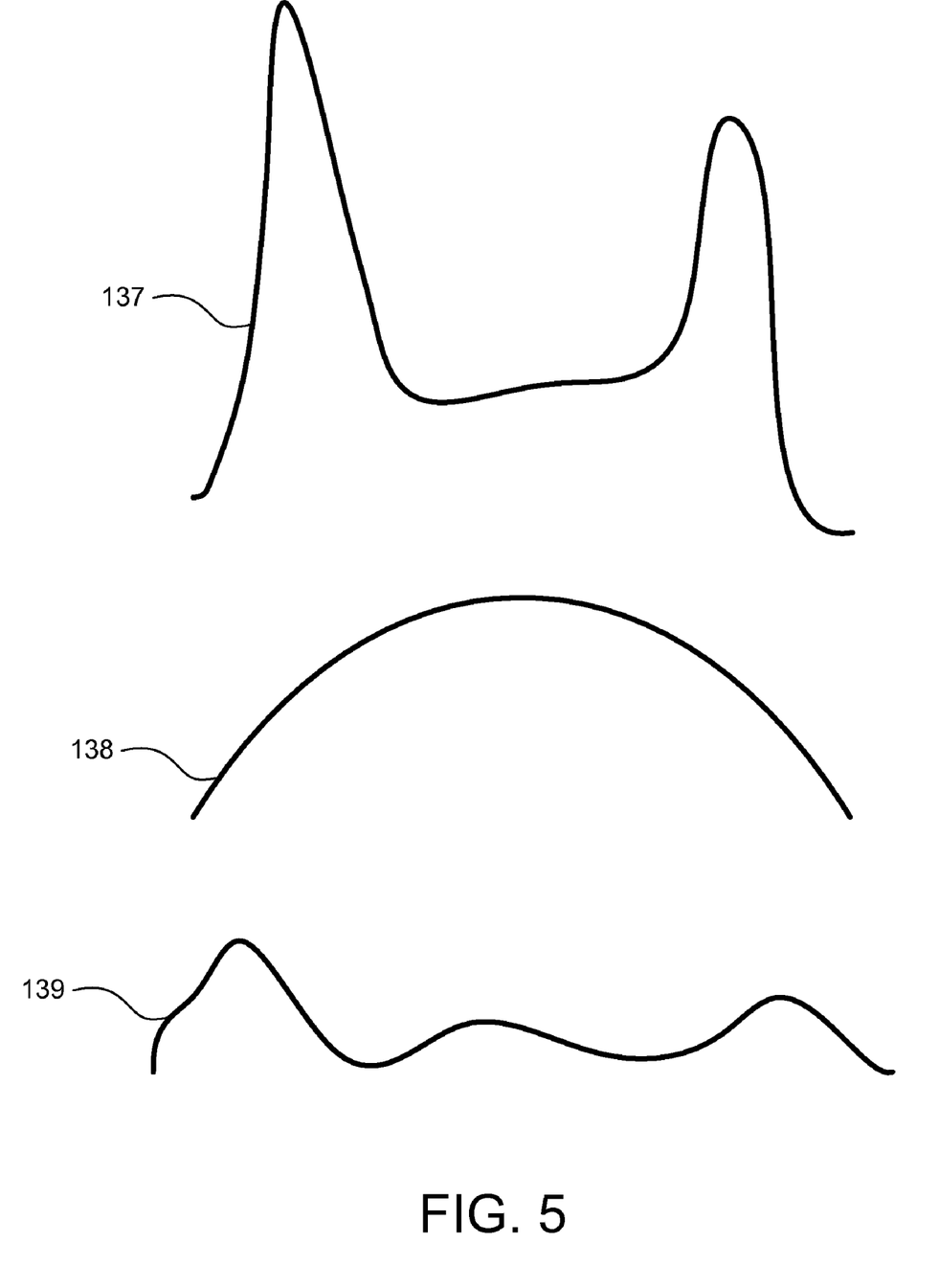
FIG. 5 depicts one embodiment of a series of line graphs to represent the intensity compensation of the optical element and the optical lens of the optical finger navigation device of FIG. 1D.

FIG. 5 depicts one embodiment of a series of line graphs to represent the intensity compensation of the optical element 102 and the optical lens 108 of the optical finger navigation device 100 of FIG. 1D. In particular, the first line graph 137 represents the intensity profile resulting from the recess 116 or the optical rise 117 in the optical element 102. As explained above, the transition portions 122 of the recess 116 or the optical rise 117 allow light to exit from the optical element 102 and illuminate the edges of the finger 128 much more than the illumination of the center of the finger 128. The second line graph 138 represents the intensity profile resulting from the intensity roll-off of the optical lens 108. As explained above, the intensity roll-off of the optical lens 108 causes the light intensity at the edges of the optical lens 108 to decrease drastically, especially when the distance between the optical element 102 and the optical lens 108 is very small. The resulting third line graph 148 shows an approximation of the combination of the first and second line graphs 137 and 138. This third line graph 139 shows that the higher edge intensities of the first line graph 137 offset, or compensate for, the lower edge intensities of the second light graph 138, resulting in a more uniform intensity pattern for detection by the sensor array 106. In some embodiments, a more uniform intensity pattern at the sensor array 106 facilitates better correlation between movement of the finger 128 on the optical element 102 and corresponding movements, for example, of a user-controlled device such as a navigation indicator (e.g., a mouse pointer or a cursor indicator).

Figure 6:
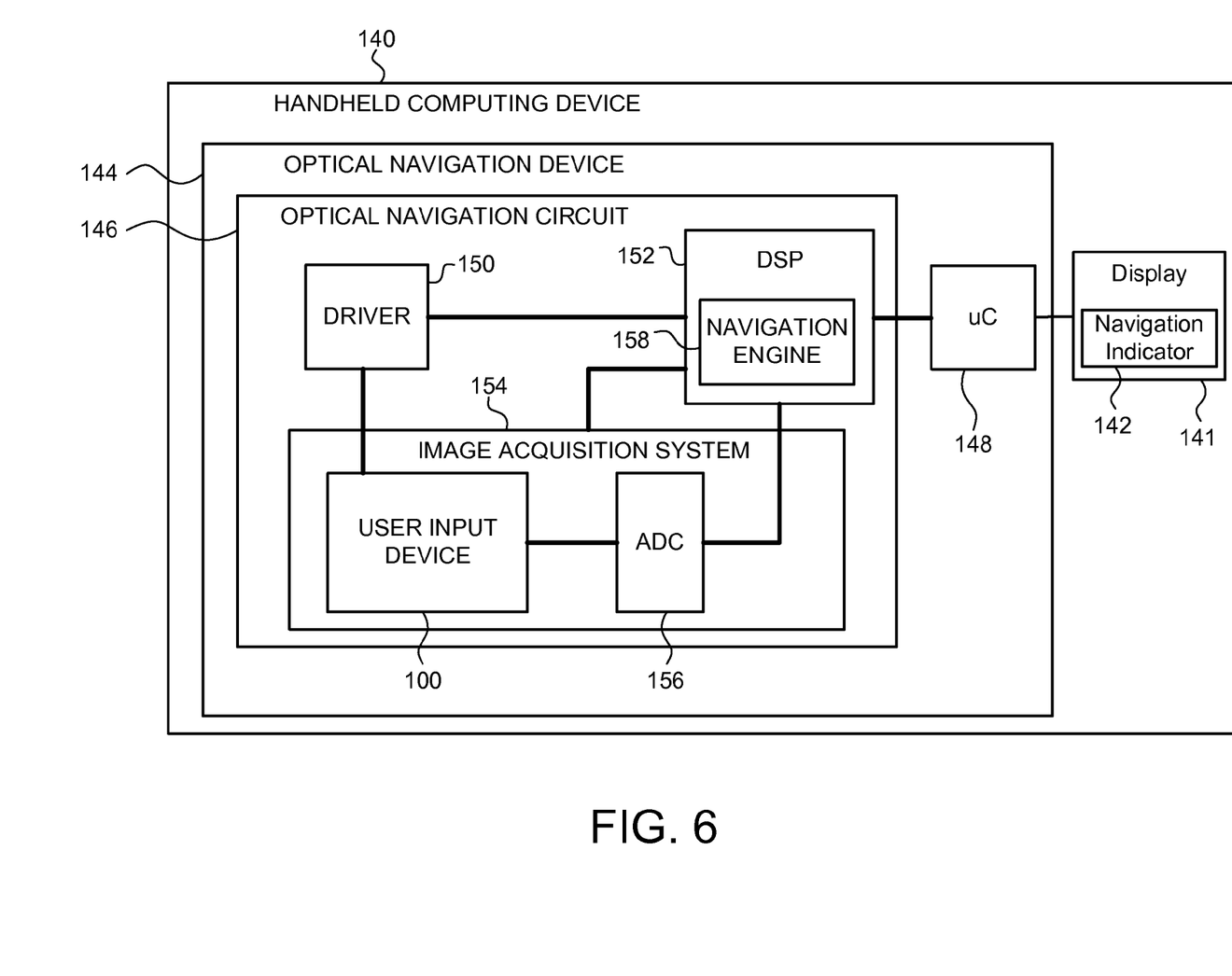
FIG. 6 depicts a block diagram of one embodiment of a portable electronic system in the form of a handheld computing device.

FIG. 6 depicts a block diagram of one embodiment of a handheld computing device 140. The handheld computing device 140 implements the user input device 100 (e.g., the optical finger navigation device 100 of FIG. 1) to facilitate user input. Examples of handheld computing devices 140 which may implement embodiments of the user input device 100 include handheld communications devices such as cellular telephones and global positioning system (GPS) devices. Additionally, other types of electronic peripherals such as personal music players, personal digital assistants (PDAs), and so forth may be implemented within embodiments of the handheld computing device 140.

By implementing an embodiment of the user input device 100 in the handheld computing device 140, the user input device 100 may facilitate, for example, user input to navigate content on a display device 141 of the handheld computing device 100. For example, the user input device 100 may facilitate control of a navigation indicator 142 on the display device 141. The navigation indicator 142 may be a cursor, a highlighter, an arrow, or another type of navigation indicator. Additionally, the user input received through the user input device 100 may facilitate other types of user-controlled functionality including, but not limited to, volume controls, audio playback selections, browser controls, and so forth. The types of user-controlled functionality that may be implemented with embodiments of the user input device 100 may depend on the type of functionality generally provided by the handheld computing device 140. Also, although FIG. 6 specifically illustrates a handheld computing device 140, other embodiments may implement the user input device 100 (or 120) in electronic devices which are portable, but not necessarily held in a user's hand, or devices which are generally considered to be not portable.

The handheld computing device 140 includes an optical navigation device 144. Although the optical navigation device 144 is shown with certain components and described herein as implementing certain functionality, other embodiments of the optical navigation device 144 may include fewer or more components to implement less or more functionality.

The illustrated optical navigation device 144 includes an optical navigation circuit 146 and a microcontroller (uC) 148. In general, the optical navigation circuit 146 generates signals representative of finger or other navigation movement at the user input device 100. The optical navigation circuit 146 then transmits one or more signals to the microcontroller 148. Exemplary types of signals transmitted from the optical navigation circuit 146 to the microcontroller 148 include channel quadrature signals based on ΔX and ΔY relative displacement values. These signals, or other signals, may be indicative of a relative movement between the finger and the user input device 100. Other embodiments of the optical navigation circuit 146 may transmit other types of signals to the microcontroller 148. In some embodiments, the microcontroller 148 implements a variety of functions, including transmitting data to and receiving data from a host computer system or other electronic device (not shown).

In order to generate the navigation signals, the depicted optical navigation circuit 146 includes a driver 150, a digital signal processor (DSP) 152, and an image acquisition system (IAS) 154. The image acquisition system 154 includes the user input device 100 and an analog-to-digital converter (ADC) 156. Other embodiments of the optical navigation circuit 146 and or the image acquisition system 154 may include fewer or more components to implement less or more functionality.

In one embodiment, the driver 150 of the optical navigation circuit 146 controls the operation of the light source 104 to generate the light signal that is transmitted to the finger interface surface 114. The reflected light signal is then received and detected by the sensor array 106 of the user input device 100, as described above.

In one embodiment, the user input device 100 generates one or more analog electrical signals corresponding to incident light on the sensor array 106. The user input device 100 then transmits the analog signals to the analog-to-digital converter 156. The analog-to-digital converter 156 converts the electrical signals from analog signals to digital signals and then passes the digital signals to the digital signal processor 152.

After the digital signal processor 152 receives the digital form of the signals from the analog-to-digital converter 156 of the image acquisition system 154, the digital signal processor 152 may perform additional processing using the electrical signals. The digital signal processor 152 then transmits one or more signals to the microcontroller 148, as described above. In some embodiments, the digital signal processor 152 includes a navigation engine 158 to generate lateral movement information based on lateral movement of the finger relative to the sensor array 112. Other embodiments of the navigation engine 158 may generate other types of movement information.

More specifically, the sensor array 106 of the user input device 100 includes an array of distinct photodetectors (not shown), for example, a 16×16 or 32×32 array of distinct photodetectors configured to detect light that is reflected from the illuminated spot on the finger interface surface 114. Each of the photodetectors in the sensor array 106 generates light intensity information that is output as a digital value (e.g., an 8-bit digital value). Image information is captured by the sensor array 106 in frames, where a frame of image information includes a set of simultaneously captured values for each distinct photodetector in the sensor array 106. The rate of image frame capture and tracking resolution can be programmable. In an embodiment, the image frame capture rate ranges up to 2,300 frames per second with a resolution of 800 counts per inch (cpi). Although some examples of frame capture rates and resolutions are provided, different frame capture rates and resolutions are contemplated.

The navigation engine 158 compares successive image frames from the sensor array 106 to determine the movement of image features between frames. In particular, the navigation engine 158 determines movement by correlating common features that exist in successive image frames from the sensor array 106. The movement between image frames is expressed in terms of movement vectors in, for example, X and Y directions (e.g., ΔX and ΔY). The movement vectors are then used to determine the movement of the input device 100 relative to the navigation surface. More detailed descriptions of examples of navigation sensor movement tracking techniques are provided in U.S. Pat. No. 5,644,139, entitled NAVIGATION TECHNIQUE FOR DETECTING MOVEMENT OF NAVIGATION SENSORS RELATIVE TO AN OBJECT, and U.S. Pat. No. 6,222,174, entitled METHOD OF CORRELATING IMMEDIATELY ACQUIRED AND PREVIOUSLY STORED FEATURE INFORMATION FOR MOTION SENSING, both of which are incorporated by reference herein.

Figure 7:
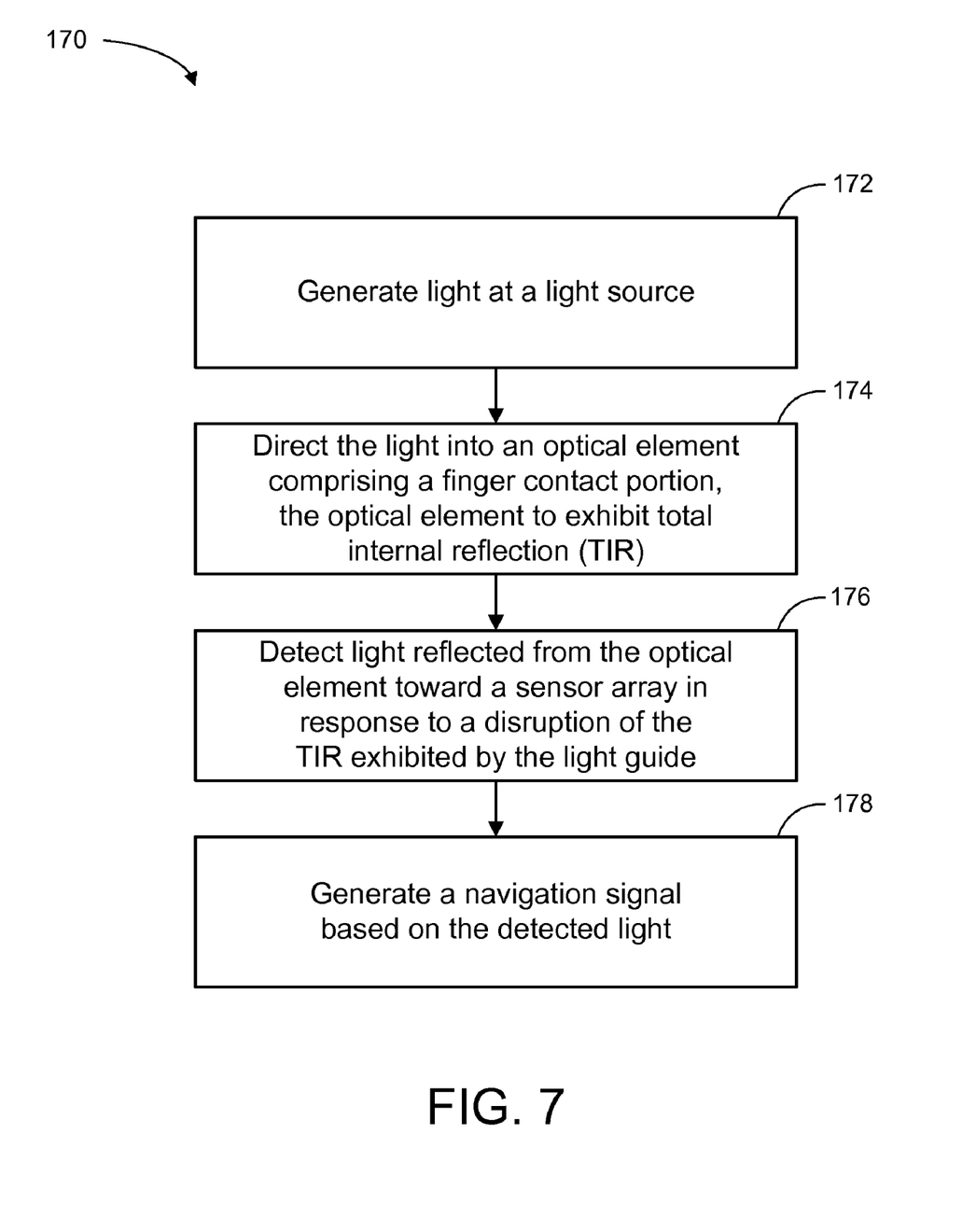
FIG. 7 depicts a flow chart diagram of one embodiment of a method for optical finger navigation.

FIG. 7 depicts a flow chart diagram of one embodiment of a method 170 for optical finger navigation. Although specific reference is made to the optical finger navigation device 100, some embodiments of the method 170 may be implemented in conjunction with other optical finger navigation systems or user input devices.

At block 172, the light source 104 generates light. The light source 104 may be a light-emitting diode (LED) or a laser, although many other types of light sources may be implemented. At block 174, the light illuminates the optical element 102, which has a finger contact portion 118, as described above. The optical element 102 at least partially exhibits total internal reflection (TIR). At block 176, the recess 116 disrupts the TIR of the light within the optical element 102, and the sensor array 106 detects the light reflected by the finger 128 in contact with the optical element 102. At block 178, the sensor array 106 generates a navigation signal based on the detected light.

In one embodiment, the overall height of the optical finger navigation system 100 is less than conventional systems. For example, the one embodiment of the optical finger navigation device 100 is equal to or less than 1.8 mm. Additionally, the light illumination pattern is substantially even to facilitate relatively higher resolution of the navigation object. Also, the optical element 102 serves both as a light pipe and an imaging surface.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A user input device comprising:
    an optical element comprising a finger interface surface, wherein at least a portion of the optical element exhibits total internal reflection (TIR);
    a light source in optical communication with the finger interface surface to provide light from the light source to the finger interface surface;
    a sensor array configured to detect light reflected from the finger interface surface in response to contact between a finger and the finger interface surface, wherein the contact between the finger and the finger interface surface disrupts the TIR and causes light to be reflected out of the optical element towards the sensor array;
    a lens located in an optical path between the finger interface surface and the sensor array;
    wherein the finger interface surface, the lens, and the sensor array are linearly aligned; and
    a navigation engine configured to generate lateral movement information, which is indicative of lateral movement of the finger relative to the sensor array, in response to the detected light;
    wherein the finger interface surface of the optical element comprises a major surface with a substantially planar portion and a finger contact portion which is at least partially out-of-plane with the substantially planar portion;
    wherein the finger interface surface further comprises a transition portion between the substantially planar portion and the finger contact portion, wherein the transition portion is at an angle relative to the planar portion and the finger contact portion to allow light to exit the optical element and illuminate the finger at the finger contact portion of the optical element;
    wherein the transition portion generates an intensity of reflected light to compensate for a light intensity pattern of the lens between the finger interface surface and the sensor array, wherein the transition portion causes the intensity of reflected light to be higher at the transition portion.

2. The user input device of claim 1, wherein the finger contact portion defines a recess which extends below the substantially planar portion of the major surface of the finger interface surface.

3. The user input device of claim 2, wherein the recess comprises a substantially cylindrical geometry.

4. The user input device of claim 3, wherein the substantially cylindrical recess comprises a radius of approximately a field of view of the sensor array and a depth of approximately 100-150 μm.

5. The user input device of claim 1, wherein the transition portion of the optical element is configured to optically match an intensity roll off pattern of the lens to produce a more uniform light intensity pattern at the sensor array.

6. The user input device of claim 5, wherein the intensity roll off pattern of the lens causes the light intensity of light exiting the lens at the edges of the lens to decrease relative to the light intensity of light exiting the lens near the center of the lens.

7. The user input device of claim 6, wherein the finger interface surface, the lens, and the sensor array are linearly aligned such that the finger interface surface is centered on an axis that runs through the center of the lens and the sensor array.

8. The portable electronic system of claim 7, wherein the intensity roll off pattern of the lens causes the light intensity of light exiting the lens at the edges of the lens to decrease relative to the light intensity of light exiting the lens near the center of the lens.

9. The portable electronic system of claim 8, wherein the finger interface surface, the lens, and the sensor array are linearly aligned such that the finger interface surface is centered on an axis that runs through the center of the lens and the sensor array.

10. A portable electronic system with optical finger navigation, the system comprising:
    a display comprising a navigation indicator;
    an optical element comprising a finger interface surface, wherein at least a portion of the optical element exhibits total internal reflection (TIR);
    a light source in optical communication with the finger interface surface to provide light from the light source to the finger interface surface; and
    a lens located in an optical path between the finger interface surface and a sensor array, wherein the sensor array is coupled to a microcontroller to generate a navigation output signal in response to detection of a light pattern at the sensor array;
    wherein the finger interface surface, the lens, and the sensor array are linearly aligned; and
    an optical finger navigation device configured to generate a navigation signal to move the navigation indicator based on a detected light pattern according to contact between a finger and the finger interface surface which disrupts the TIR of the optical element and causes light to be reflected out of the optical element towards the optical finger navigation device;
    wherein the finger interface surface of the optical element comprises a major surface with a substantially planar portion and a finger contact portion which is at least partially out-of-plane with the substantially planar portion;
    wherein the finger contact portion defines a recess which extends below the substantially planar portion of the major surface of the finger interface surface;
    wherein the recess generates an intensity of reflected light to compensate for a light intensity pattern of the lens between the finger interface surface and the sensor array;
    wherein the recess causes the intensity of reflected light to be higher at an edge of the recess.

11. The portable electronic system of claim 10, wherein the recess of the optical element is configured to optically match an intensity roll off pattern of the lens to produce a more uniform light intensity pattern at the sensor array.

* * * * *